(12) United States Patent  
He et al.

(10) Patent No.: US 10,777,810 B2  
(45) Date of Patent: Sep. 15, 2020

(54) LITHIUM METAL SECONDARY BATTERY CONTAINING A PROTECTED LITHIUM ANODE

(71) Applicant: Nanotek Instruments, Inc., Dayton, OH (US)

(72) Inventors: Hui He, Dayton, OH (US); Baofei Pan, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 182 days.

(21) Appl. No.: 16/123,212

(22) Filed: Sep. 6, 2018

(65) Prior Publication Data

US 2019/0393487 A1 Dec. 26, 2019

Related U.S. Application Data

(63) Continuation-in-part of application No. 16/014,614, filed on Jun. 21, 2018.

(51) Int. Cl.
| | |
|---|---|
| *H01M 4/36* | (2006.01) |
| *H01M 10/0525* | (2010.01) |
| *H01M 10/0565* | (2010.01) |
| *H01M 10/058* | (2010.01) |
| *H01M 4/66* | (2006.01) |
| *H01M 2/16* | (2006.01) |
| *H01M 4/02* | (2006.01) |

(52) U.S. Cl.
CPC ......... *H01M 4/366* (2013.01); *H01M 2/1673* (2013.01); *H01M 4/667* (2013.01); *H01M 10/058* (2013.01); *H01M 10/0525* (2013.01); *H01M 10/0565* (2013.01); *H01M 2004/021* (2013.01); *H01M 2004/027* (2013.01); *H01M 2004/028* (2013.01)

(58) Field of Classification Search
CPC .... H01M 10/052; H01M 4/133; H01M 4/405; H01M 2004/028
See application file for complete search history.

(56) References Cited

U.S. PATENT DOCUMENTS

| | | |
|---|---|---|
| 2,798,878 A | 7/1957 | Hummers |
| 3,836,511 A | 9/1974 | O'farrell et al. |
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |

(Continued)

FOREIGN PATENT DOCUMENTS

| | | |
|---|---|---|
| CN | 103258990 A | 8/2013 |
| CN | 105322132 A | 2/2016 |

(Continued)

OTHER PUBLICATIONS

"Nylon" en.wikipedia.org/wiki/Nylon. Accessed Feb. 18, 2020 (Year: 2020).
PCT/US19/55758 International Search Report and Written Opinion dated Jan. 31, 2020, 15 pages.
U.S. Appl. No. 15/434,632 Final Office Action dated Dec. 26, 2019, 20 pages.
U.S. Appl. No. 15/442,803 Final Office Action dated Feb. 24, 2020, 36 pages.

(Continued)

*Primary Examiner* — Ladan Mohaddes

(57) ABSTRACT

Provided is a lithium secondary battery, comprising a cathode, an anode, and a porous separator or electrolyte, wherein the anode comprises: (a) an anode active layer containing a layer of lithium or lithium alloy, in a form of a foil, coating, or multiple particles aggregated together, as an anode active material; (b) a first anode-protecting layer having a thickness from 1 nm to 100 μm (preferably <1 μm and more preferably <100 nm) and comprising a lithium ion-conducting material having a lithium ion conductivity from $10^{-8}$ S/cm to $5\times10^{-2}$ S/cm; and (c) a second anode-protecting layer having a thickness from 1 nm to 100 μm and comprising an elastomer having a fully recoverable tensile elastic strain from 2% to 1,000% and a lithium ion conductivity from $10^{-8}$ S/cm to $5\times10^{-2}$ S/cm.

30 Claims, 5 Drawing Sheets

(56) References Cited

U.S. PATENT DOCUMENTS

| | | |
|---|---|---|
| 2005/0034993 A1 | 2/2005 | Gozdz et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0064409 A1 | 3/2012 | Zhamu et al. |
| 2012/0070708 A1 | 3/2012 | Ohira et al. |
| 2012/0088154 A1 | 4/2012 | Liu et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |
| 2016/0181611 A1 | 6/2016 | Cho et al. |
| 2016/0218341 A1 | 7/2016 | Kumar et al. |
| 2016/0301075 A1 | 10/2016 | Zhamu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0018799 A1 | 1/2017 | Jeong |
| 2017/0047584 A1 | 2/2017 | Hwang et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0207484 A1 | 7/2017 | Zhamu et al. |
| 2017/0288211 A1 | 10/2017 | Zhamu et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0083265 A1 | 3/2018 | Singh et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |
| 2018/0248173 A1 | 8/2018 | Pan et al. |
| 2018/0277913 A1 | 9/2018 | Pan et al. |
| 2018/0287142 A1 | 10/2018 | Zhamu et al. |
| 2018/0294475 A1 | 10/2018 | Zhamu et al. |
| 2018/0294476 A1 | 10/2018 | Zhamu et al. |
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0088958 A1 | 3/2019 | Viner et al. |
| 2019/0260028 A1 | 8/2019 | Zhamu et al. |
| 2019/0319303 A1 | 10/2019 | Kushida et al. |
| 2019/0386332 A1 | 12/2019 | Zhamu et al. |
| 2019/0393495 A1 | 12/2019 | He et al. |
| 2019/0393510 A1 | 12/2019 | He et al. |
| 2019/0393543 A1 | 12/2019 | Zhamu et al. |

FOREIGN PATENT DOCUMENTS

| | | |
|---|---|---|
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017172104 A1 | 10/2017 |
| WO | 2017200798 A1 | 11/2017 |
| WO | 2018148090 A1 | 8/2018 |

OTHER PUBLICATIONS

U.S. Appl. No. 15/483,347 Final Office Action dated Dec. 27, 2019, 22 pages.

U.S. Appl. No. 15/483,348 Final Office Action dated Jan. 20, 2020, 9 pages.

U.S. Appl. No. 15/676,677 Nonfinal Office Action dated Feb. 5, 2020, 15 pages.

U.S. Appl. No. 15/903,808 Nonfinal Office Action dated Jan. 28, 2020, 8 pages.

U.S. Appl. No. 16/010,965 Nonfinal Office Action dated Jan. 8, 2020, 5 pages.

U.S. Appl. No. 16/010,975 Nonfinal Office Action dated Jan. 8, 2020, 5 pages.

U.S. Appl. No. 16/017,294 Nonfinal Office Action dated Jan. 23, 2020, 6 pages.

An et al., "Diameter-Selected Synthesis of Single Crystalline Trigonal Selenium Nanowires" Materials Chemistry and Physics (2007) vol. 101, No. 2-3, pp. 357-361.

An et al., "Large-Scale Synthesis of High Quality Trigonal Selenium Nanowires" European Journal of Inorganic Chemistry (2003) vol. 17, pp. 3250-3255.

(56) References Cited

OTHER PUBLICATIONS

Arai et al., "Versatile supramolecular cross-linker: a rotaxane cross-linker that directly endows vinyl polymers with movable cross-links" Chemistry (2013) vol. 19, pp. 5917-5923.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Choi et al., "Highly elastic binders integrating polyrotaxanes for silicon microparticle anodes in lithium ion batteries" Science (2017) vol. 357, No. 6348, pp. 279-283.
Dwivedi et al., "An Organic Acid-induced Synthesis and Characterization of Selenium Nanoparticles" Journal of Nanotechnology (2011) Article ID 651971, 6 pages.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Ji et al., "A highly ordered nanostructured carbon—sulphur cathode for lithium—sulphur batteries" Nature Materials (2009) vol. 8, pp. 500-506.
Karlicky et al., "Halogenated Graphenes: Rapidly Growing Family of Graphene Derivatives" ACS Nano (2013) vol. 7, No. 8, pp. 6434-6464.
KR—10-2015-0044333 English language translation.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Liu et al., "Solutions for the problems of silicon-carbon anode materials for lithium-ion batteries" Royal Society Open Science (2018) vol. 5, p. 172370.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
U.S. Appl. No. 14/999,080 Nonfinal Office Action dated Nov. 9, 2018.
U.S. Appl. No. 14/999,080 Nonfinal Office Action dated Oct. 30, 2019, 15 pages.
U.S. Appl. No. 15/442,278 Final Office Action dated Oct. 21, 2019, 16 pages.
U.S. Appl. No. 15/442,803 Nonfinal Office Action dated Dec. 28, 2018, 24 pages.
U.S. Appl. No. 15/442,803 Nonfinal Office Action dated Jul. 25, 2019, 37 pages.
U.S. Appl. No. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.

(56) References Cited

OTHER PUBLICATIONS

U.S. Appl. No. 15/483,348 Nonfinal Office Action dated Sep. 16, 2019, 22 pages.
U.S. Appl. No. 15/901,367 Nonfinal Office Action dated Jun. 10, 2019, 12 pages.
U.S. Appl. No. 15/910,465 Nonfinal Office Action dated Nov. 1, 2019, 12 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 16/014,623 Nonfinal Office Action dated Oct. 4, 2019, 8 pages.
U.S. Appl. No. 16/113,676 Nonfinal Office Action dated Oct. 4, 2019, 9 pages.
U.S. Appl. No. 16/120,875 Nonfinal Office Action dated Oct. 4, 2019, 10 pages.
U.S. Appl. No. 16/123,218 Nonfinal Office Action dated Oct. 4, 2019, 9 pages.
U.S. Appl. No. 16/166,574 Nonfinal Office Action dated Oct. 4, 2019, 9 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
Elabd et al., "Sulfonation and Characterization of Poly(styrene-isobutylene-styrene) Triblock Copolymers at High Ion-Exchange Capacities" Polymer (2004) vol. 45, pp. 3037-3043.
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.

LITHIUM METAL SECONDARY BATTERY CONTAINING A PROTECTED LITHIUM ANODE

CROSS REFERENCE TO RELATED APPLICATIONS

The present application is a continuation-in-part of U.S. patent application Ser. No. 16/014,614, filed Jun. 21, 2018, which is hereby incorporated by reference for all purposes.

FIELD OF THE INVENTION

The present invention relates to the field of rechargeable lithium metal battery having a lithium metal layer (in a form of thin lithium foil, lithium coating, or sheet of lithium particles) as an anode active material layer and a method of manufacturing same.

BACKGROUND OF THE INVENTION

Lithium-ion and lithium (Li) metal cells (including lithium metal secondary cell, lithium-sulfur cell, lithium-selenium cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI$—$Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and the liquid electrolyte) does not have and cannot maintain a good contact with the lithium metal. This effectively reduces the effectiveness of the electrolyte to support dissolution of lithium ions (during battery discharge), transport lithium ions, and allowing the lithium ions to re-deposit back onto the lithium anode (during battery recharge).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier-to-implement approach to preventing Li metal dendrite-induced internal short circuit and thermal runaway problems in Li metal batteries, and to reducing or eliminating the detrimental reactions between lithium metal and the electrolyte.

Hence, an object of the present invention was to provide an effective way to overcome the lithium metal dendrite and reaction problems in all types of Li metal batteries having a lithium metal anode. A specific object of the present invention was to provide a lithium metal cell that exhibits a high specific capacity, high specific energy, high degree of safety, and a long and stable cycle life.

SUMMARY OF THE INVENTION

Herein reported is a lithium metal secondary battery, comprising a cathode, an anode, and an electrolyte or separator-electrolyte assembly disposed between the cathode and the anode, wherein the anode comprises: (a) a layer of lithium or lithium alloy (in the form of a foil, coating, or multiple particles aggregated together) as an anode active material layer; (b) a first anode-protecting layer having a thickness from 1 nm to 100 μm and comprising a thin layer of a lithium ion-conducting material (having a lithium ion conductivity from $10^{-8}$ S/cm to $5 \times 10^{-2}$ S/cm) in physical contact with and in protecting relation to the anode active material layer (e.g. covering the anode active material); and (c) a second anode-protecting layer, in contact with the first protecting layer, having a thickness from 1 nm to 100 μm and comprising an elastomer having a fully recoverable tensile elastic strain from 2% to 1,000%, a lithium ion conductivity from $10^{-8}$ S/cm to $5 \times 10^{-2}$ S/cm when measured at room temperature.

The first anode-protecting layer partially or, preferably, completely covers the anode active material layer when the battery is made. The second anode-protecting layer is disposed between the first anode-protecting layer and the electrolyte or separator-electrolyte assembly layer. The foil or coating of lithium or lithium alloy may be supported by a current collector (e.g. a Cu foil, a Ni foam, a porous layer of nanofilaments, such as graphene sheets, carbon nanofibers, carbon nanotubes, etc.). A porous separator may not be necessary if the electrolyte is a solid-state electrolyte.

In some embodiments, the lithium battery does not contain a porous separator and the second anode-protecting layer itself acts as a separator that electronically separates the anode active material layer from the cathode.

For defining the claims, the invented lithium metal secondary battery does not include a lithium-sulfur cell or lithium-selenium cell. As such, the cathode does not include sulfur, lithium polysulfide, selenium and lithium polyselenide.

In certain embodiments, the lithium ion-conducting material in the first anode-protecting layer comprises one or multiple materials selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $x=0<x\leq1$ and $1\leq y\leq4$.

In some embodiments, the lithium ion-conducting material in the first anode-protecting layer comprises a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The lithium ion-conducting material in the first anode-protecting layer may comprise a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a co-polymer thereof, a sulfonated derivative thereof, or a combination thereof.

In certain embodiments, the lithium ion-conducting material comprises an inorganic solid-state electrolyte material having a lithium ion conductivity greater than $10^{-6}$ S/cm. There are a wide variety of solid electrolyte materials that can be adapted as a lithium ion-conducting material in the presently invented first anode-protecting layer. The solid-state electrolyte material may be selected from a ceramic electrolyte, glass-ceramic electrolyte, glass electrolyte, metal sulfide electrolyte, or a combination thereof. Commonly used solid electrolytes that can be implemented in the presently invented first anode-protecting layer include the well-known NASICON-type, Granet-type, LISICON-type, Perovskite-type, sulfide-type, $Li_3N$-type, Argyrodite-type, and thin-film solid state electrolytes.

The lithium ion-conducting material may be formed as a layer of sintered ceramic, glass, glass-ceramic, or sulfide material, etc. as would be normally used as a solid-state electrolyte in a lithium battery. Alternatively, this material may be formed into a thin film (e.g. via sputtering or laser-assisted deposition) deposited on a primary surface of the anode active material layer or a primary surface of the second anode-protecting layer. The layer preferably has a thickness from 2 nm to 2 μm, more preferably from 2 nm to 100 nm. However, in some embodiments, the solid-state electrolyte material used in the first anode protecting layer may comprise particles of a sintered or un-sintered solid electrolyte material that are bonded together by a resin binder to form a layer of structural integrity. Preferably the resin binder is from 1% to 50% of this second anode-protecting layer layer. This layer may be chemically bonded to the elastomer layer or integral with the elastomer layer. For instance, this layer may be an extension of the elastomer layer, but preferably having a different composition than the rest of the elastomer layer; e.g. having a much higher concentration of solid electrolyte material particles or other additives near the skin zone of the elastomer layer than the rest of the elastomer layer.

The elastomer (sulfonated or non-sulfonated) in the second anode-protecting layer is a high-elasticity material which exhibits an elastic deformation that is at least 2% (preferably at least 5% and up to approximately 1,000%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%.

In some embodiments, the elastomer in the second anode-protecting layer preferably and more typically has a fully recoverable 0elastic tensile strain from 5% to 300% (most typically from 10% to 150%), a thickness from 10 nm to 20 µm, and an electrical conductivity of at least $10^{-4}$ S/cm when measured at room temperature on a cast thin film 20 µm thick.

Preferably, the elastomer in the second anode-protecting layer contains a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metal locene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These elastomers or rubbers, when present without graphene sheets, exhibit a high elasticity (having a fully recoverable tensile strain from 2% to 1,000%). In other words, they can be stretched up to 1,000% (10 times of the original length when under tension) and, upon release of the tensile stress, they can fully recover back to the original dimension. By adding from 0.01% to 50% by weight of a conductive reinforcement material and/or a lithium ion-conducting species dispersed in an elastomeric matrix material, the fully recoverable tensile strains are typically reduced down to 2%-500% (more typically from 5% to 300% and most typically from 10% to 150%).

The elastomer, if sulfonated, becomes significantly more lithium ion-conducting. The lithium ion conductivity of an elastomer, sulfonated or un-sulfonated, may be further improved if some desired amount of lithium ion-conducting additive is incorporated into the elastomer matrix.

The first anode-protecting layer is preferably chemically bonded to the second anode-protecting layer or is integral with the second anode-protecting layer. Such an connection enables the first anode-protecting layer to move in a concerted manner with the second anode protecting layer when the elastomer deforms (being compressed or relaxed) during battery recharge or discharge.

It may be noted that the lithium foil/coating layer may decrease in thickness due to dissolution of lithium into the electrolyte to become lithium ions as the lithium battery is discharged, creating a gap between the current collector/lithium foil and the solid electrolyte layer in a conventional all-solid lithium battery. Such a gap would make the re-deposition of lithium ions back to the anode active layer impossible. We have observed that the instant elastomer layer is capable of expanding or shrinking congruently or conformably with the anode active material layer. The elastic stress of the elastomer layer can help to maintain a good contact between the current collector (or the lithium film itself) and the first anode-protecting layer, enabling the re-deposition of lithium ions without interruption.

The elastomer in the second anode-protecting layer may further contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

At the anode side, preferably and typically, the elastomer for the second protective layer is designed or selected to have a lithium ion conductivity no less than $10^{-5}$ S/cm, more preferably no less than $10^{-4}$ S/cm, and most preferably no less than $10^{-3}$ S/cm. Some of the selected elastomers, when sulfonated, can exhibit a lithium ion conductivity greater than $10^{-2}$ S/cm. In some embodiments, the elastomer is a neat elastomer containing no additive or filler dispersed therein. In others, the elastomer is an elastomer matrix composite containing from 0.1% to 40% by weight (preferably from 1% to 30% by weight) of a lithium ion-conducting additive dispersed in an elastomer matrix material. In some embodiments, the elastomer contains from 0.1% by weight to 10% by weight of a reinforcement nanofilament selected from carbon nanotube, carbon nanofiber, graphene, or a combination thereof.

In some embodiments, the elastomer in the second anode-protecting layer is selected from a sulfonated or un-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, or a combination thereof.

In some embodiments, the elastomer in the second anode-protecting layer further contains a lithium ion-conducting additive dispersed therein, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$ and $1\le y\le4$.

In the second anode-protecting layer, the elastomer may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

In some embodiments, the elastomer in the second anode-protecting layer may form a mixture, blend, or semi-IPN with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The cathode active material may be selected from an inorganic material, an organic material, a polymeric material, or a combination thereof. The inorganic material may be selected from a metal oxide, metal phosphate, metal silicide, metal selenide, metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x \leq 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from poly[methanetetryl-tetra(thiomethylene)](PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a sulfonated elastomer composite layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

The present invention also provides a lithium metal-air battery comprising an air cathode, an anode comprising the first anode-protecting layer (i.e. comprising a lithium ion-conducting material) and the second anode-protecting layer (e.g. an elastomer or elastomer matrix composite) as defined above, and electrolyte, or electrolyte combined with a separator, disposed between the anode and the air cathode. In the air cathode, oxygen from the open air (or from an oxygen supplier external to the battery) is the primary cathode active material. The air cathode needs an inert material to support the lithium oxide material formed at the cathode. The applicants have surprisingly found that an integrated structure of conductive nanofilaments can be used as an air cathode intended for supporting the discharge product (e.g., lithium oxide).

Hence, a further embodiment of the present invention is a lithium metal-air battery, wherein the air cathode comprises an integrated structure of electrically conductive nanometer-scaled filaments that are interconnected to form a porous network of electron-conducting paths comprising interconnected pores, wherein the filaments have a transverse dimension less than 500 nm (preferably less than 100 nm). These nanofilaments can be selected from carbon nanotubes (CNTs), carbon nanofibers (CNFs), graphene sheets, carbon fibers, graphite fibers, etc.

The invention also provides a method of manufacturing a lithium battery, the method comprising: (a) providing a cathode active material layer and an optional cathode current collector to support the cathode active material layer; (b) providing an anode active material layer (e.g. containing a lithium metal or lithium alloy foil or coating) and an optional anode current collector to support the lithium metal or lithium alloy foil or coating; (c) providing a first anode-protecting layer having a thickness from 1 nm to 100 μm and comprising a thin layer of a lithium ion-conducting material having a lithium ion conductivity from $10^{-8}$ S/cm to $5 \times 10^{-2}$ S/cm and being in physical contact with the anode active material layer; (d) providing a second anode-protecting layer of an elastomer having a recoverable tensile elastic strain from 2% to 1,000% (preferably from 5% to 300%), a lithium ion conductivity no less than $10^{-8}$ S/cm at room temperature, and a thickness from 1 nm to 100 μm (preferably from 10 nm to 10 μm); and (e) providing an electrolyte in contact with the second anode-protecting layer and the cathode active material layer and an optional separator electrically separating the anode and the cathode. This second anode-protecting layer is disposed between the first anode protecting layer (covering the lithium metal or lithium alloy foil or coating) and the porous separator (or the electrolyte).

The invention also provides a method of improving the cycle-life of a lithium metal secondary battery (not including a lithium-sulfur battery or lithium-selenium battery). The method comprises implementing two anode-protecting layers between an anode active material layer and an electrolyte or a porous separator/electrolyte assembly. The first anode-protecting layer has a thickness from 1 nm to 100 μm (preferably from 2 nm to 100 nm) and comprises a thin layer of a lithium ion-conducting material having a lithium ion conductivity from $10^{-8}$ S/cm to $5 \times 10^{-2}$ S/cm and being in physical contact with the anode active material layer.

The second anode-protecting layer comprises an elastomer having a recoverable tensile elastic strain from 2% to 1,000% (preferably from 5% to 300%), a lithium ion conductivity no less than $10^{-8}$ S/cm (preferably >$10^{-5}$ S/cm) at room temperature, and a thickness from 1 nm to 100 μm (preferably from 10 nm to 10 μm). This second anode-protecting layer is disposed between the first anode-protecting layer (covering the lithium metal or lithium alloy foil or coating) and the porous separator (or the electrolyte).

In some embodiments, the elastomer in the second layer contains a material selected from a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly (ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the above-defined method, the step of implementing a first anode-protecting layer may be conducted by spraying a slurry of a lithium ion-conducting material (e.g. an inorganic solid electrolyte material along with an optional binder resin, or a polymer electrolyte material) dispersed in a liquid (e.g. an organic solvent) onto a primary surface of the anode active material layer, followed by liquid removal. Alternatively, one may prepare a layer of such an ion-conducting material first (e.g. via casting or coating over a glass substrate, drying the layer and separating the layer to form a free-standing lithium ion-conducting layer), which is then followed by laying this layer over a primary surface of the anode active material layer (e.g. a Li foil).

The step of implementing a second anode-protecting layer may be conducted by depositing a layer of an elastomer onto one primary surface of the first protective layer that in turn covers the anode active material layer. This step comprises optionally compressing the protected anode to improve the contact between the anode-protecting layers and the anode active material layer, followed by combining the protected anode, the separator/electrolyte, and the cathode together to form the lithium metal secondary battery. A good contact between the anode active material layer and the anode-protecting layer is essential to reducing internal resistance.

In certain embodiments, the step of implementing the anode-protecting layers is conducted by (i) preparing a lithium ion-conducting material-protected anode active material layer; (ii) depositing a layer of an elastomer onto one primary surface of the separator to form a coated separator; and (iii) combining the ion-conducting material (first protecting layer)-protected active anode layer, the coated separator, a cathode, and the electrolyte together to form the lithium metal secondary battery. A compressive stress may be advantageously applied (e.g. via press-rolling) to improve the contact between the anode-protecting layers and the anode active material layer to be protected.

In certain embodiments, the step of implementing anode-protecting layers is conducted by forming a first protecting layer and a second protecting layer of elastomer, followed by laminating the anode active material layer, the first protecting layer, the second protecting layer of elastomer, the optional separator layer, the cathode layer, along with the electrolyte to form the lithium metal secondary battery, wherein an optional (but desirable) compressive stress is applied to improve the contact between the anode-protecting layers and the anode active material layer during or after this laminating step.

Preferably, the elastomer layer has a lithium-ion conductivity from $10^{-5}$ S/cm to $5 \times 10^{-2}$ S/cm. In some embodiments, the elastomer has a recoverable tensile strain from 10% to 300% (more preferably >30%, and further more preferably >50%).

In certain embodiments, the procedure of providing an elastomer contains providing a mixture/blend/composite of an elastomer (sulfonated or un-sulfonated) with an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nanofiber, and/or graphene), or a combination thereof.

In this mixture/blend/composite, the lithium ion-conducting material is dispersed in the elastomer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In some embodiments, the elastomer contains a lithium ion-conducting material dispersed therein and selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The two anode-protecting layers implemented between the anode active layer and the separator (or the electrolyte) is mainly for the purpose of reducing or eliminating the lithium metal dendrite by providing a more stable Li metal-electrolyte interface that is more conducive to uniform deposition of Li metal during battery charges. These anode-protecting layers also act to block the penetration of any dendrite, if initiated, from reaching the separator or cathode. The second anode-protecting layer, being highly elastic, also can shrink or expand conformably, responsive to the thickness increase or decrease of the anode active material layer. Other advantages will become more transparent later.

DESCRIPTION OF THE PREFERRED EMBODIMENTS

Figure 1:
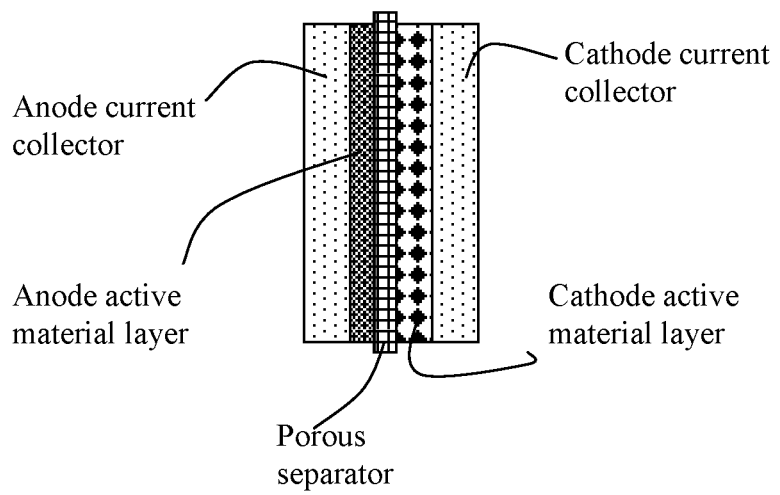
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This invention is directed at a lithium metal secondary battery, which is preferably based on an organic electrolyte, a polymer gel electrolyte, an ionic liquid electrolyte, a quasi-solid electrolyte, or a solid-state electrolyte. The shape of a lithium metal secondary battery can be cylindrical, square, button-like, etc. The present invention is not limited to any battery shape or configuration or any type of electrolyte. The invented lithium secondary battery does not include a lithium-sulfur cell or lithium-selenium cell.

The invention provides a lithium metal secondary battery, comprising a cathode, an anode, and electrolyte or separator-electrolyte assembly (porous separator and liquid electrolyte, gel electrolyte, quasi-solid electrolyte, etc.) disposed between the cathode and the anode.

In certain embodiments, the anode comprises: (a) a layer of lithium or lithium alloy (in the form of a foil, coating, or multiple particles aggregated together) as an anode active material layer; (b) a first anode-protecting layer having a thickness from 1 nm to 100 μm and comprising a thin layer of a lithium ion-conducting material (having a lithium ion conductivity from $10^{-8}$ S/cm to $5\times10^{-2}$ S/cm) in physical contact with and in protecting relation to the anode active material layer (e.g. covering the anode active material); and (c) a second anode-protecting layer, in contact with the first protecting layer (e.g. physically supporting or chemically bonded to the first anode-protecting layer), having a thickness from 1 nm to 100 μm and comprising an elastomer having a fully recoverable tensile elastic strain from 2% to 1,000%, a lithium ion conductivity from $10^{-8}$ S/cm to $5\times10^{-2}$ S/cm when measured at room temperature.

The foil or coating of lithium or lithium alloy, as the anode active material layer or electrode, may be supported by a current collector (e.g. a Cu foil, a Ni foam, a porous layer of nanofilaments, such as membrane, paper, foam, or fabric of graphene sheets, carbon nanofibers, carbon nanotubes, etc. forming a 3D interconnected network of electron-conducting pathways). In some embodiments, the first anode-protecting layer partially or, preferably, completely covers the anode active material layer when the battery is made.

In certain embodiments, the lithium ion-conducting material in the first anode-protecting layer comprises one or multiple materials selected from $Li_2CO_3$, $Li_2O$, $Li_2C_2O_4$, LiOH, LiX, $ROCO_2Li$, HCOLi, ROLi, $(ROCO_2Li)_2$, ($CH_2OCO_2Li$)$_2$, $Li_2S$, $Li_xSO_y$, or a combination thereof, wherein X=F, Cl, I, or Br, R=a hydrocarbon group, $0<x\leq 1$ and $1\leq y\leq 4$.

In some embodiments, the lithium ion-conducting material in the first anode-protecting layer comprises a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The lithium ion-conducting material in the first anode-protecting layer may comprise a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a co-polymer thereof, a sulfonated derivative thereof, or a combination thereof.

In certain embodiments, the lithium ion-conducting material comprises an inorganic solid-state electrolyte material having a lithium ion conductivity greater than $10^{-6}$ S/cm. There are a wide variety of solid electrolyte materials that can be adapted as a lithium ion-conducting material in the presently invented first anode-protecting layer. The solid-state electrolyte material may be selected from a ceramic electrolyte, glass-ceramic electrolyte, glass electrolyte, metal sulfide electrolyte, or a combination thereof. Commonly used solid electrolytes that can be implemented in the presently invented first anode-protecting layer include the well-known NASICON-type, Granet-type, LISICON-type, Perovskite-type, sulfide-type, and thin-film solid state electrolytes.

The synthesis or production of solid state electrolyte-types of inorganic materials is well-known in the art. The following review articles provide a good description of various types of solid-state electrolyte materials:
1) Feng Zheng, et. al. "Review on solid electrolytes for all-solid-state lithium-ion batteries," Journal of Power Sources, Volume 389, 15 Jun. 2018, Pages 198-213. https://doi.org/10.1016/j.jpowsour.2018.04.022
2) Kazunori Takada, "Progress in solid electrolytes toward realizing solid-state lithium batteries," Journal of Power Sources, Volume 394, 1 Aug. 2018, Pages 74-85. https://doi.org/10.1016/j.jpowsour.2018.05.003
3) Zhonghui Gao, et al., "Promises, Challenges, and Recent Progress of Inorganic Solid-State Electrolytes for All-Solid-State Lithium Batteries," Advanced Materials, https://doi.org/10.1002/adma.201705702
4) Arumugam Manthiram, et al. "Lithium battery chemistries enabled by solid-state electrolytes," Nature Reviews Materials volume 2, Article number: 16103 (2017)

The lithium ion-conducting inorganic materials for use in the first anode-protecting layer may be selected from commonly used solid electrolytes, such as, $Li_3N$, lithium-phosphorous-oxynitride (LiPON), $Li_2S$-based glass, NASICON-type oxides, $Li_{0.05-3x}La_{0.5+x}TiO_3$, $Li_7La_3Zr_2O_{12}$, their mixtures with a polymer electrolyte. These materials have demonstrated fairly good Li-ion conductivity.

Lithium ion conducting sulfide glasses, such as $Li_2S$—$GeS_2$, $Li_2S$—$P_2S_5$, $Li_2S$—$B_2S_3$, and $Li_2S$—$SiS_2$ systems can exhibit lithium ion conductivities higher than $10^{-4}$ S/cm at room temperature. Among these systems, lithium thio-silicate $Li_2S$—$SiS_2$ glasses show not only higher conductivity, but also higher glass transition temperatures and easy preparation without vacuum sealing. When these $Li_2S$—$SiS_2$ glasses are composited with small amounts of ortho-oxosalts, such as $Li_3PO_4$, $Li_4SiO_4$ and $Li_4GeO_4$, significantly higher conductivities over $10^{-3}$ S/cm at room temperature and a wide electrochemical window could be obtained. Furthermore, the addition of a small amount of those ortho-oxosalts to the $Li_2S$—$SiS_2$ sulfide system could also improve the glass stability against crystallization. Both high conductivity and high thermal stability of the $Li_2S$—$SiS_2$-based oxy-sulfide glasses are desirable features for use in the first anode-protecting layer.

Thio-LiSICON-based electrolytes have high conductivity and low activation energy at room-temperature. For example, glass ceramics with thio-LiSICON structures could exhibit even higher conductivity ($3.2\times 10^{-3}$ S/cm for $70Li_2S$-$30P_2S_5$), about an order of magnitude higher conductivity at room temperature than their amorphous counterparts.

Elemental substitution may be used to increase lithium ion conductivity of solid electrolyte crystals. For example, the conductivity of $Li_3PS_4$ crystal could be significantly increased by incorporating phosphorus and germanium into $Li_3PS_4$ crystals and the resulting $Li_{3.25}P_{0.75}Ge_{0.25}S_4$ crystals can exhibit a high conductivity higher than $2.2\times 10^{-3}$ S/cm at room temperature. Further, $Li_{10}GeP_2S_{12}$ with a three-dimensional framework structure could exhibit an extremely high lithium ionic conductivity of $1.2\times 10^{-2}$ S/cm at room temperature.

Another class of lithium ion-conducting material is the so-called sodium super ionic conductors, such as (NASICON)-type lithium ion conductors, due to their high conductivity ($\sim 7\times 10^{-4}$ S/cm) at room temperature and their stability in both atmosphere and water. For example, glass-ceramics could exhibit an ionic conductivity over $10^{-4}$ S/cm at room temperature and the $Al^{3+}$ substitution to form a $Li_{1+x}Al_xTi_{2-x}(PO_4)_3$ system (x=0.4) could make two orders of magnitude enhancement in conductivity. The substitution of $Ti^{4+}$ by smaller sized $Al^{3+}$ cation could reduce the unit-cell dimension of NASICON framework, significantly increasing $Li^+$ conductivity. The $Li_{1+x}Al_xTi_{2-x}(PO_4)_3$ materials with a high conductivity up to $1.3\times 10^{-3}$ S/cm are commercially available.

The Perovskite structure, such as $Li_{0.05-3x}La_{0.5+x}TiO_3$ (LLTO), could show a bulk conductivity as high as $1\times 10^{-3}$ S/cm. Garnet-like structural compounds, such as $Li_5La_3Ta_2O_{12}$ (LLTa) and $Li_7La_3Zr_2O_{12}$ (LLZ), are relatively stable against Li metal. In addition, their bulk Li-ion conductivity is as high as $5\times 10^{-4}$ S/cm at room temperature.

The lithium ion-conducting material may be formed as a layer of sintered ceramic, glass, glass-ceramic, or sulfide material, etc. as would be normally used as a solid-state electrolyte in a lithium battery. Alternatively, this material may be formed into a thin film (e.g. via sputtering or laser-assisted deposition) deposited on a primary surface of the anode active material layer or a primary surface of the second anode-protecting layer. The layer preferably has a thickness from 2 nm to 2 μm, more preferably from 2 nm to 100 nm. However, in some embodiments, the solid-state electrolyte material used in the first anode protecting layer may comprise particles of a sintered or un-sintered solid electrolyte material that are bonded together by a resin binder to form a layer of structural integrity. Preferably the resin binder is from 1% to 50% of this second anode-protecting layer. This layer may be chemically bonded to the elastomer layer or integral with the elastomer layer. For instance, this layer may be an extension of the elastomer layer, but preferably having a different composition than the rest of the elastomer layer; e.g. having a much higher concentration of solid electrolyte material particles or other additives near the skin zone of the elastomer layer than the rest of the elastomer layer.

Preferably, the second anode-protecting layer (i.e. the elastomer layer) has a lithium ion conductivity no less than $10^{-6}$ S/cm (typically and desirably from $10^{-5}$ S/cm to $5\times10^{-2}$ S/cm, measured at room temperature), and a thickness from 10 nm to 20 μm. These conditions are more amenable to allowing lithium ions to migrate in and out of the elastomer layer without much resistance.

Preferably, the elastomer contains a sulfonated or non-sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

Preferably, the second anode-protecting layer (the elastomer layer) is different in composition than the electrolyte per se used in the lithium battery and maintains as a discrete layer (not to be dissolved in the electrolyte) that is disposed between the protected anode active material layer (e.g. Li foil protected by the first protecting layer) and the electrolyte (or electrolyte-separator layer). The second anode-protecting layer may contain a liquid electrolyte that permeates or impregnates into the sulfonated or non-sulfonated elastomer.

We have discovered that the two anode-protecting layers, in combination, provide several unexpected benefits: (a) the formation of dendrite has been essentially eliminated; (b) uniform deposition of lithium back to the anode side is readily achieved; (c) the layers ensure smooth and uninterrupted transport of lithium ions from/to the lithium foil/coating and through the interface between the lithium foil/coating and the protective layer with minimal interfacial resistance; (d) significant reduction in the amount of dead lithium particles near the Li foil; and (e) cycle stability can be significantly improved and cycle life increased.

In a conventional lithium metal cell, as illustrated in FIG. 1, the anode active material (lithium) is deposited in a thin film form or a thin foil form directly onto an anode current collector (e.g. a Cu foil). The battery is a lithium metal battery, lithium sulfur battery, lithium-air battery, lithium-selenium battery, etc. As previously discussed in the Background section, these lithium secondary batteries have the dendrite-induced internal shorting and "dead lithium" issues at the anode.

Figure 2:
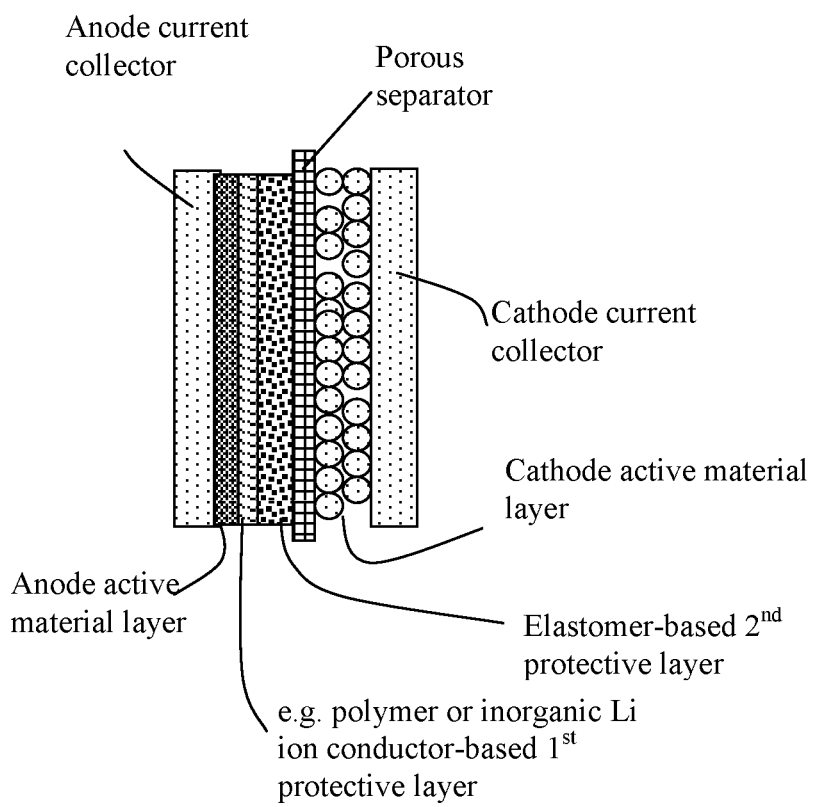
FIG. 2 Schematic of a presently invented lithium metal battery cell containing an anode layer (a thin Li foil or Li coating deposited on a surface of a current collector, Cu foil), a lithium ion-conducting material-based $1^{st}$ anode-protecting layer, an elastomer-based $2^{nd}$ anode-protecting layer, an electrolyte (not shown) or porous separator/electrolyte layer, and a cathode active material layer, which is composed of particles of a cathode active material, a conductive additive (not shown) and a resin binder (not shown). An optional cathode current collector supporting the cathode active layer is also shown.

We have solved these challenging issues that have troubled battery designers and electrochemists alike for more than 30 years by developing and implementing two anode-protecting layers disposed between the lithium foil/coating and the separator layer. As schematically shown in FIG. 2, one embodiment of the present invention is a lithium metal battery cell containing an anode layer (a thin Li foil or Li coating deposited on a surface of a current collector, such as a layer of graphene foam or a sheet of Cu foil), two anode-protecting layers, a porous separator, and a cathode active material layer, which is composed of particles of a cathode active material, a conductive additive (not shown) and a resin binder (not shown). A cathode current collector (e.g. Al foil) supporting the cathode active layer is also shown in FIG. 2. The lithium metal or alloy in the anode may be in a form of particles (e.g. surface-protected or surface-stabilized particles of Li or Li alloy).

The elastomer in the second anode-protecting layer exhibits an elastic deformation of at least 2% when measured under uniaxial tension. In the field of materials science and engineering, the "elastic deformation" is defined as a deformation of a material (when being mechanically stressed) that is essentially fully recoverable upon release of the load and the recovery is essentially instantaneous. The elastic deformation is preferably greater than 5%, more preferably greater than 10%, further more preferably greater than 30%, and still more preferably greater than 100% but less than 500%.

It may be noted that although FIG. 2 shows a lithium coating pre-existing at the anode when the lithium battery is made, this is but one of several embodiments of the instant invention. An alternative embodiment is a lithium battery that does not contain a lithium foil or lithium coating at the anode (only an anode current collector, such as a Cu foil or a graphene/CNT mat) when the battery is made. The needed lithium to be bounced back and forth between the anode and the cathode is initially stored in the cathode active material (e.g. lithium vanadium oxide $Li_xV_2O_5$, instead of vanadium oxide, $V_2O_5$; or lithium transition metal oxide or phosphate, instead of, say, $MoS_2$). During the first charging procedure of the lithium battery (e.g. as part of the electrochemical formation process), lithium comes out of the cathode active material, migrates to the anode side, and deposits on the anode current collector. The presence of the presently invented protective layers enables uniform deposition of lithium ions on the anode current collector surface. Such an alternative battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically less air-sensitive.

The presently invented lithium secondary batteries can contain a wide variety of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material as a cathode active material for the lithium battery is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

In certain preferred embodiments, the inorganic material as a cathode active material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{1.3}$, $Li_xV_6O_{13}$, their doped versions, their derivatives, and combinations thereof, wherein $0.1 < x \leq 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS₂)₃]n), lithiated 1,4,5,8-naphthalenetetraol formaldehyde polymer, hexaazatrinaphtylene (HATN), hexaazatriphenylene hexacarbonitrile (HAT(CN)₆), 5-benzylidene hydantoin, isatine lithium salt, pyromellitic diimide lithium salt, tetrahydroxy-p-benzoquinone derivatives (THQLi₄), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from poly[methanetetryl-tetra(thiomethylene)](PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

Preferably and typically, the elastomer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the elastomer comprises from 0.1% to 50% (preferably 1% to 35%) by weight of a lithium ion-conducting additive dispersed in an elastomer matrix material. The elastomer must have a high elasticity (elastic deformation strain value >2%). An elastic deformation is a deformation that is fully recoverable and the recovery process is essentially instantaneous (no significant time delay). The elastomer composite can exhibit an elastic deformation from 2% up to 1,000% (10 times of its original length), more typically from 5% to 500%, and further more typically from 10% to 300%, and most typically and desirably from 30% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Further, we have unexpectedly discovered that the presence of an amount of a lithium salt or sodium salt (1-35% by weight) and a liquid solvent (0-50%) can significantly increase the lithium-ion or sodium ion conductivity.

Typically, an elastomer is originally in a monomer or oligomer states that can be cured to form a cross-linked polymer that is highly elastic. Prior to curing, these polymers or oligomers are soluble in an organic solvent to form a polymer solution. An ion-conducting or electron-conducting additive may be added to this solution to form a suspension. This solution or suspension can then be formed into a thin layer of polymer precursor on a surface of the first anode-protecting layer. The polymer precursor (monomer or oligomer and initiator) is then polymerized and cured to form a lightly cross-linked polymer. Alternatively, this thin layer of polymer may be tentatively deposited on a solid substrate (e.g. surface of a polymer or glass), dried, and separated from the substrate to become a free-standing polymer layer. This free-standing layer is then laid on a primary surface of the first anode-protecting layer or implemented between a protected lithium film/coating layer and electrolyte or separator. polymer layer formation can be accomplished by using one of several procedures well-known in the art; e.g. spraying, spray-painting, printing, coating, extrusion-based film-forming, casting, etc.

One may dispense and deposit a layer of a sulfonated or un-sulfonated elastomer onto a primary surface of the anode active material layer. Alternatively, one may dispense and deposit a layer of an elastomer onto a primary surface of a separator layer. Further alternatively, one may prepare separate free-standing discrete layers of the elastomer (intended as the second anode-protecting layer) and the lithium ion-conducting material (intended as the first anode-protecting layer) first. These two layers are then laminated together with the anode active material layer, electrolyte or a separator/electrolyte assembly, and a cathode layer to form a battery cell.

Thus, the invention also provides a method of manufacturing a lithium battery, the method comprising: (a) providing a cathode active material layer and an optional cathode current collector to support the cathode active material layer; (b) providing an anode active material layer (e.g. containing a lithium metal or lithium alloy foil or coating) and an optional anode current collector to support the lithium metal or lithium alloy foil or coating; (c) providing a first anode-protecting layer having a thickness from 1 nm to 100 µm (preferably from 2 nm to 100 nm) and comprising a thin layer of a lithium ion-conducting material having a lithium ion conductivity from $10^{-8}$ S/cm to $5\times10^{-2}$ S/cm and being in physical contact with the anode active material layer; (d) providing a second anode-protecting layer of an elastomer having a recoverable tensile elastic strain from 2% to 1,000% (preferably from 5% to 300%), a lithium ion conductivity no less than $10^{-8}$ S/cm at room temperature, and a thickness from 1 nm to 100 m (preferably from 10 nm to 10 µm); and (e) providing an electrolyte in contact with the second anode-protecting layer and the cathode active material layer and an optional separator electrically separating the anode and the cathode. This second anode-protecting layer is disposed between the first anode protecting layer (covering the lithium metal or lithium alloy foil or coating) and the porous separator (or the electrolyte).

The invention also provides a method of improving the cycle-life of a lithium metal secondary battery (not including a lithium-sulfur battery or lithium-selenium battery). The method comprises implementing two anode-protecting layers between an anode active material layer and an electrolyte or a porous separator/electrolyte combination. The first anode-protecting layer has a thickness from 1 nm to 100 µm (preferably from 2 nm to 100 nm) and comprises a thin layer of a lithium ion-conducting material having a lithium ion conductivity from $10^{-8}$ S/cm to $5\times10^{-2}$ S/cm and being in physical contact with the anode active material layer. The second anode-protecting layer comprises an elastomer having a recoverable tensile elastic strain from 2% to 1,000% (preferably from 5% to 300%), a lithium ion conductivity no less than $10^{-8}$ S/cm at room temperature, and a thickness from 1 nm to 100 µm (preferably from 10 nm to 10 µm).

It may be noted that the presently invented lithium secondary battery comprises at least the following layers: an optional anode current collector (e.g. a Cu foil or a graphene foam), an anode active material layer (e.g. a discrete lithium foil, a lithium coating layer, or a layer of lithium particles) supported by the anode current collector (if present), a first anode-protecting layer (e.g. a layer of polymer or inorganic lithium ion-conductor) substantially fully covering the anode active material layer and in good contact thereto, a second anode-protecting layer (elastomer or elastomer composite) substantially fully covering the first anode-protecting layer, an electrolyte/separator assembly (electrolyte alone or in combination with a layer of porous separator or membrane), a cathode active material layer, and an optional cathode current collector (e.g. Al foil, graphene paper sheet, etc.). The porous membrane or separator is optional.

There are many different sequences with which these individual layers may be produced and combined together. For instance, one may produce all components in a free-standing form and then combine them together. Alternatively, one may produce certain components in single free-standing films but other components in a 2-layer or 3-layer structure, followed by combining these components and structures together. For instance, one may spray, cast, coat, or deposit a layer of ion-conducting material onto a primary surface of a lithium foil to form a two-layer structure. One may also spray, cast, or coat an elastomer layer onto a primary surface of a separator to form a two-layer structure. These two-layer structures are then laminated with other components to form a battery cell.

Thus, the step of implementing a first anode-protecting layer may be conducted by spraying a slurry of a conductive material (e.g. particles of an inorganic solid electrolyte and an optional binder resin) dispersed in a liquid (e.g. an organic solvent) onto a primary surface of the anode active material layer, followed by liquid removal. Alternatively, one may prepare a free-standing layer of such a lithium ion-conductive material first, which is then laid over a primary surface of the anode active material layer (e.g. a Li foil).

The step of implementing a second anode-protecting layer may be conducted by depositing a layer of an elastomer onto one primary surface of the first protective layer that in turn covers the anode active material layer. This step includes optionally compressing the protected anode to improve the contact between the anode-protecting layers and the anode active material layer, followed by combining the protected anode, the separator/electrolyte, and the cathode together to form the lithium metal secondary battery. A good contact between the anode active material layer and the anode-protecting layer is essential to reducing internal resistance.

In certain embodiments, the step of implementing the anode-protecting layers is conducted by (i) preparing a lithium ion-conductive material-protected anode active material layer; (ii) depositing a layer of an elastomer onto one primary surface of a separator to form a coated separator; and (iii) combining the ion-conducting material (first protecting layer)-protected active anode layer, the coated separator, a cathode, and the electrolyte together to form the lithium metal secondary battery. A compressive stress may be advantageously applied (e.g. via press-rolling) to improve the contact between the anode-protecting layer and the anode active material layer to be protected.

In certain embodiments, the step of implementing anode-protecting layers is conducted by forming a first protecting layer of ion-conducting material and a second protecting layer of elastomer, followed by laminating the anode active material layer, the first protecting layer, the second protecting layer of elastomer, the separator layer, the cathode layer, along with the electrolyte to form the lithium metal secondary battery, wherein an optional (but desirable) compressive stress is applied to improve the contact between the anode-protecting layers and the anode active material layer during or after this laminating step.

Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

A broad array of elastomers can be sulfonated to become sulfonated elastomers. The elastomeric material may be selected from natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, an elastomer in the second anode-protecting layer can form a polymer matrix composite containing a lithium ion-conducting additive dispersed in the elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In some embodiments, the elastomer in the second anode-protecting layer can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The elastomer in the second anode-protecting layer may form a mixture, blend, or interpenetrating network with an electron-conducting polymer selected from polyaniline, polypyrrole, polythiophene, polyfuran, a bi-cyclic polymer, derivatives thereof (e.g. sulfonated versions), or a combination thereof. In some embodiments, the elastomer may form a mixture, co-polymer, or semi-interpenetrating network with a lithium ion-conducting polymer selected from poly (ethylene oxide) (PEO), polypropylene oxide (PPO), poly (acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

The electrolyte for a lithium secondary cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone ($\gamma$-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a lithium metal cell.

The following provide some representative examples to illustrate the best mode of practice and should not be construed as limiting the scope of the invention.

Example 1: Ion-Conducting Polyethylene Oxide (PEO) and Polypropylene Oxide (PPO) Polymers Containing Nanoparticles of $ZrO_2$, $SiO_2$, or $Al_2O_3$ as a First Anode-Protecting Layer Sulfated zirconia was prepared by treating commercial $ZrO_2$ powders (Aldrich nanopowders, 20-30 nm) with a concentrated $(NH_4)_2SO_4$ solution. As a first step, the procedure included drying the commercial $ZrO_2$ powders at 240° C. for 24 h in a vacuum oven. Then, the powders were added to an aqueous solution of $(NH_4)_2SO_4$ and stirred vigorously. The mixture was subsequently filtered and the collected wet powders dried in a vacuum oven. The dried powders were thermally treated according to the following scheme: (i) heating up to 350° C. at 1° C./min; (ii) resting at 350° C. for 2 h; (iii) heating up to 550° C. at 1° C./min; and (iv) resting at 550° C. for 2 h. Particles of $SiO_2$ and $Al_2O_3$ were similarly treated. Sulfated-$ZrO_2$, $SiO_2$, and $Al_2O_3$, respectively, along with 1-10% by wt. of $LiBF_4$, were mixed with PEO and PPO using a melt-mixing procedure to obtain polymer composite layers for use as the first anode-protecting layer.

Example 2: A Layer of Lithium Ion-Conducting Polymer as a First Anode-Protecting Layer Poly [(oxyethylene)$_9$ methacrylate]-g-poly(dimethyl siloxane) (POEM-g-PDMS) (70:30) was synthesized by free radical methods. In one representative procedure, 6 mL of poly(dimethyl siloxane) monomethacrylate macromonomer (Aldrich, Mn=10,000 g/mol) and 13 mL of poly(ethylene glycol) methyl ether methacrylate monomer (Aldrich, Mn=475 g/mol) were added to 80 mL of ethyl acetate under a constant-stirring condition. This formulation corresponds to a weight ratio of 70:30 (POEM:PDMS) or a molar ratio of ~50:1 (POEM:PDMS side chains). Subsequently, 6 mg of the initiator 2,2-azobisisobutyronitrile (AIBN, Aldrich) were added (monomer/initiator ratio=825/1) and the flask was sealed and purged for 30 min with argon. The solution was then heated to 68° C. in an oil bath and left under constant stirring. After 24 h, the polymer was precipitated in hexane and cast into films. The product had a molecular weight of ~480,000 g/mol with respect to a polystyrene calibration curve as determined by gel permeation chromatography (GPC), corresponding to roughly 15 PDMS side chains per molecule.

Example 3: $LiBH_4$ as a Lithium Ion-Conducting Material for Use in a First Anode-Protecting Layer $LiBH_4$ (Aldrich, >90% purity) and KI (Aldrich, >99.998% purity) were mixed in a mortar at a given molar ratio and pelletized under 1 t/cm². The obtained pellet was sealed in a silica glass tube and sintered under vacuum conditions. Samples with a high $LiBH_4$ content were sintered at 180° C., while $LiBH_4$ poor samples were sintered at approximately 250° C. After sintering the samples for 1 h, they were ground and then re-pelletized for the subsequent 8 h of sintering. The $LiBH_4$ powder was added into a PEO polymer matrix to make a layer of PEO/$LiBH_4$ composite-based anode-protecting layer.

Example 4: Evaporation-Induced Self-Assembly Preparation of NASICON-Type Nanosized Solid Electrolyte $Li_{1.4}Al_{0.4}Ti_{1.6}(PO_4)_3$(LATP) as an Ion Conductor Ethanol soluble $LiNO_3 \cdot H_2O$, $AlCl_3$, $TiCl_4$, and $H_3PO_4$ were used as starting materials. The materials were accurately weighed according to the stoichiometric ratio as in $Li_{1.4}Al_{0.4}Ti_{1.6}(PO_4)_3$. In a procedure, $TiCl_4$ and $AlCl_3$ were first dissolved in EtOH and magnetically stirred for 30 min. Then, $LiNO_3 \cdot H_2O$ and $H_3PO_4$ were added to the solution under vigorous stirring for another 2 h. The homogenous sol solution was poured into open Petri dishes and heated at various temperatures (35, 50, and 75° C.) in air, allowing the solvent to evaporate until viscous sol-gel was formed. The sol-gel was further aged at 100° C. for 6 h to become the dry LATP precursor. Such dried gel was subsequently pyrolyzed in air at 300° C. for 3 h, followed by annealing at 800° C. for 2 h to obtain LATP powder.

Example 4: Preparation of Garnet-Type $Li_{7-x}La_3Zr_{2-x}Ta_xO_{12}$ (LLZT) as an Ion Conductor in a First Anode-Protecting Layer LLZT with a Ta content (x) of 0.45 was synthesized using a conventional solid-state reaction process. Stoichiometric amounts of $LiOH-H_2O$ (99% with 10% excess was added to account for the evaporation of lithium at high temperatures), $La(OH)_3$ (99.99%), $ZrO_2$ (98%) and $Ta_2O_5$ (99.9%), which were then ground and mixed by planetary ball-milling with zirconia balls and ethanol for 3 h in a zirconia pot, and then calcined at 900° C. for 6 h in air using a tungsten carbide crucible. The calcined powders were ground again by planetary ball-milling for 1 h, and then pressed into pellets at 300 MPa by cold isostatic pressing. Finally, the pellets were sintered at 1150° C. for 15 h in air.

Example 5: Preparation of Perovskite-Type Oxynitride Solid Solutions

Precursor material, $Li_{0.5}La_{0.5}TiO_3$, was prepared by a conventional solid-state reaction technique. Reagents of $Li_2CO_3$ (Alfa 99.9% in purity), $La_2O_3$ (Alfa 99.9% purity, heated overnight at 1000° C. in air atmosphere) and $TiO_2$ (Sigma Aldrich 99.9% purity) were mixed in a molar ratio of 1.1:1:2. Considering the potential loss of Li during the evaporation, 10% excess was used to obtain the desired composition. The mixture was annealed at 1073° K for 6 hours and subsequently at 1473° K for 12 hours in air atmosphere with several intermittent grindings until single phase $Li_{0.5}La_{0.5}TiO_3$ was obtained.

Polycrystalline oxynitride powder samples were prepared by thermal ammonolysis of synthesized precursor $Li_{0.5}La_{0.5}TiO_3$ with flowing ammonia (500 ml/min) for 1, 5 and 10 hours at 1223° K. In addition to the conventional solid-state reaction technique, polycrystalline oxynitride powder samples were also obtained by thermal ammonolysis of oxide precursor.

Example 6: Sulfonation of Triblock Copolymer Poly(Styrene-Isobutylene-Styrene) or SIBS Both non-sulfonated and sulfonated elastomers are used to build the second anode-protecting layer in the present invention. The sulfonated versions typically provide a much higher lithium ion conductivity and, hence, enable higher-rate capability or higher power density. The elastomer matrix can contain a lithium ion-conducting additive, an electron-conducting additive, and/or a lithium metal-stabilizing additive.

An example of the sulfonation procedure used in this study for making a sulfonated elastomer is summarized as follows: a 10% (w/v) solution of SIBS (50 g) and a desired amount of graphene oxide sheets (0 to 40.5% by wt.) in methylene chloride (500 ml) was prepared. The solution was stirred and refluxed at approximately 40° C., while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of graphene sheets and a lithium metal-stabilizing additives (e.g. $LiNO_3$ and lithium trifluoromethanesulfonimide), if not added at an earlier stage, were then added into the solution to form slurry samples. The slurry samples were slot-die coated on a PET plastic substrate to form layers of sulfonated elastomer composite. The lithium metal-stabilizing additives were found to impart stability to lithium metal-electrolyte interfaces.

Example 7: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of graphene sheets or CNTs (0%-40% by wt.) were introduced into the reactor, and the polymer solution was irradiated for 1 h at room temperature with UV light of 365 nm and power of 100 W.

The resulting thioacetylated polybutadiene (PB-TA)/graphene composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting slurry was spray-dried to obtain sulfonated polybutadiene (PB-SA) composite layers.

It may be noted that lithium ion-conducting additive may be added at different stages of the procedure: before, during or after BZP is added.

Example 8: Synthesis of Sulfonated SBS

Sulfonated styrene-butadiene-styrene triblock copolymer (SBS) based elastomer was directly synthesized. First, SBS (optionally along with a lithium ion-conducting additive or electron-conducting additive) is first epoxidized by performic acid formed in situ, followed by ring-opening reaction with an aqueous solution of NaHSO$_3$. In a typical procedure, epoxidation of SBS was carried out via reaction of SBS in cyclohexane solution (SBS concentration=11 g/100 mL) with performic acid formed in situ from HCOOH and 30% aqueous H$_2$O$_2$ solution at 70° C. for 4 h, using 1 wt. % poly(ethylene glycol)/SBS as a phase transfer catalyst. The molar ratio of H$_2$O$_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt. % TEAB/ESBS as a phase transfer catalyst and 5 wt. % DMA/ESBS as a ring-opening catalyst. Herein, TEAB=tetraethyl ammonium bromide and DMA=N,N-dimethyl aniline. An aqueous solution of NaHSO$_3$ and Na$_2$SO$_3$ (optionally along with graphene sheets or CNTs, if not added earlier) was then added with vigorous stirring at 60° C. for 7 h at a molar ratio of NaHSO$_3$/epoxy group at 1.8 and a weight ratio of Na$_2$SO$_3$/NaHSO$_3$ at 36%. This reaction allows for opening of the epoxide ring and attaching of the sulfonate group according to the following reaction:

plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; H$_2$O$_2$/olefin molar ratio=5.5) were added in about 15 min. It may be cautioned that the reaction is autocatalytic and strongly exothermic! The conductive reinforcement material was added before or after this reaction. The resulting slurry was stirred for 1 h, and then most of the solvent was distilled off in vacuum at 35° C. Finally, the slurry containing the sulfonated elastomer, along with desired additives, was added with acetonitrile, cast into films, washed with fresh acetonitrile, and dried in vacuum at 35° C. to obtain layers of sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, desired additives may be added at various stages of the procedure.

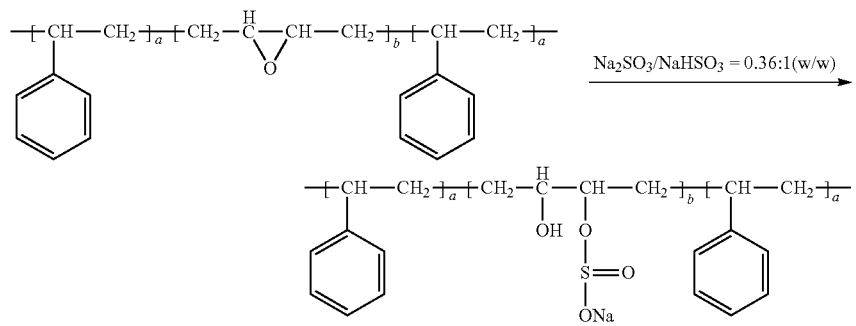

The reaction was terminated by adding a small amount of acetone solution containing antioxidant. The mixture was washed with distilled water and then precipitated by ethanol while being cast into thin films, followed by drying in a vacuum dryer at 50° C. It may be noted electron-conducting additive (e.g. graphene sheets or CNTs) and/or lithium ion-conducting additive (e.g. Li$_2$CO$_3$ and NaBF$_4$) may be added during various stages of the aforementioned procedure (e.g. right from the beginning, or prior to the ring opening reaction).

Example 9: Synthesis of Sulfonated SBS by Free Radical Addition of Thiolacetic Acid (TAA) Followed by In Situ Oxidation with Per-Formic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with Example 10: Lithium Battery Containing a Sulfonated Elastomer Composite-Protected Lithium Anode and a Cathode Containing V$_2$O$_5$ Particles Cathode active material layers were prepared from V$_2$O$_5$ particles and graphene-embraced V$_2$O$_5$ particles, respectively. The V$_2$O$_5$ particles were commercially available. Graphene-embraced V$_2$O$_5$ particles were prepared in-house. In a typical experiment, vanadium pentoxide gels were obtained by mixing V$_2$O$_5$ in a LiCl aqueous solution. The Li$^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nanobelt sizes, and then spray-drying at 200° C. to obtain graphene-embraced V$_2$O$_5$ composite particulates. Selected amounts of V$_2$O$_5$ particles and graphene-embraced V$_2$O$_5$ particles, respectively, were then each made into a cathode layer following a well-known slurry coating process.

The sulfonated elastomer films for use as the second anode-protecting layer were SIBS as prepared in Example 6. Several tensile testing specimens were cut from the film and tested with a universal testing machine. The results indicate that this series of sulfonated elastomer films have an elastic deformation from approximately 150% to 465%. The addition of up to 30% by weight of a conductive reinforcement material (CNTs, graphene, CNFs, etc.) and/or an inorganic additive typically reduces this elasticity down to a reversible tensile strain from 6% to 110%.

For electrochemical testing, the working electrodes (cathode layers) were prepared by mixing 88% of graphene-embraced $V_2O_5$ particles, 5.0 wt. % CNTs, and 7.0 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter electrode (actually an anode of a Li-transition metal oxide cell), Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cell featuring sulfonated elastomer composite binder and that containing PVDF binder were evaluated by galvanostatic charge/discharge cycling at a current density of 50 mA/g using an Arbin Electrochemical Testing Station.

Figure 3:
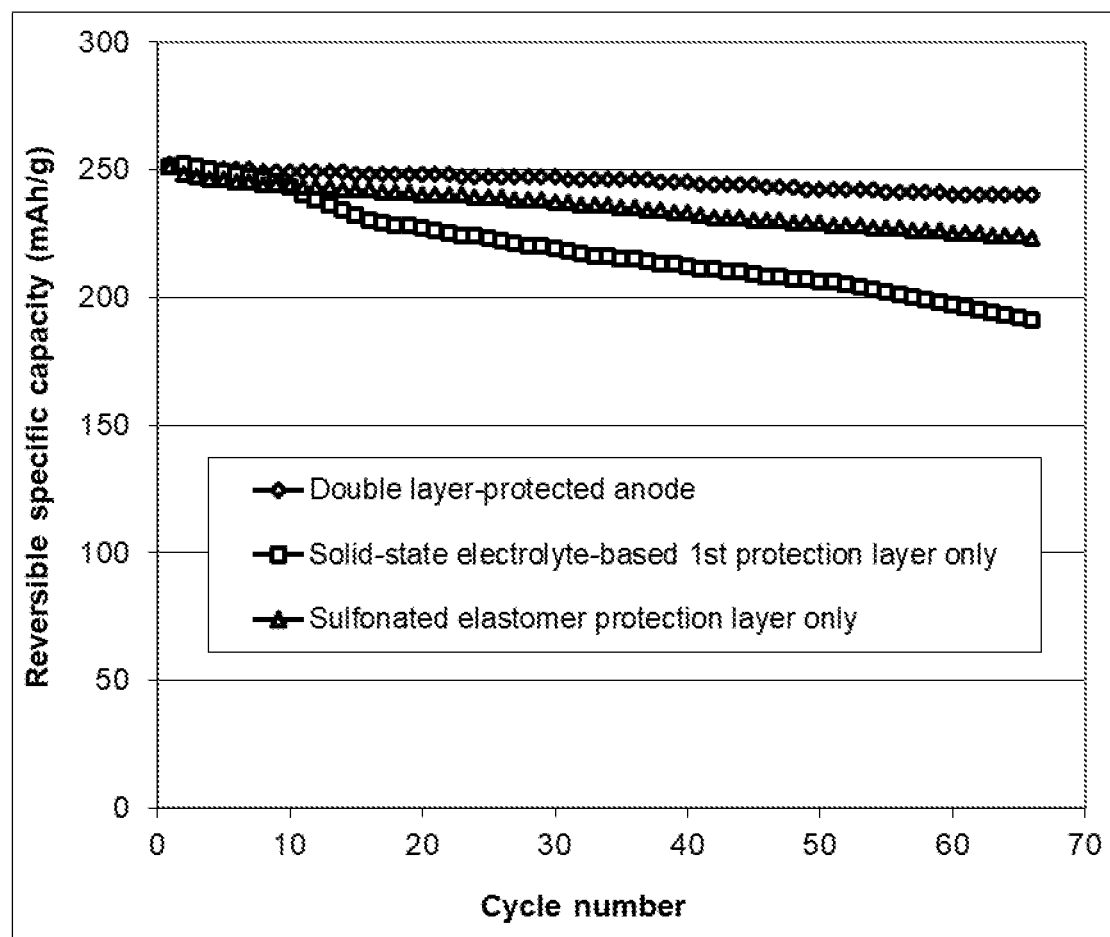
FIG. 3 The specific lithium storage specific capacity curves of three lithium cells each having a cathode containing graphene-wrapped $V_2O_5$ particles: the first cell having a Garnet-type electrolyte species $Li_{7-x}La_3Zr_{2-x}Ta_xO_{12}$-based first anode-protecting layer and a sulfonated elastomer-based $2^{nd}$ anode-protecting layer; the second cell having a sulfonated elastomer-based anode-protecting layer only, and the third cell having the species $Li_{7-x}La_3Zr_{2-x}Ta_xO_{12}$-based anode-protecting layer only.

Summarized in FIG. 3 are the specific lithium storage specific capacity curves of three lithium cells each having a cathode containing graphene-wrapped $V_2O_5$ particles: first cell having a Garnet-type $Li_{7-x}La_3Zr_{2-x}Ta_xO_{12}$-based first anode-protecting layer and a sulfonated elastomer-based $2^{nd}$ anode-protecting layer; the second cell having a sulfonated elastomer-based anode-protecting layer only, and the third cell having a $Li_{7-x}La_3Zr_{2-x}Ta_xO_{12}$-based anode-protecting layer only. As the number of cycles increases, the specific capacity of the cell containing only the solid-state electrolyte-based anode-protecting layer drops at the fastest rate. In contrast, the presently invented approach of double protection layers provides the battery cell with the most stable and highest specific capacity for a large number of cycles. These data have clearly demonstrated the surprising and superior performance of the presently invented double layer protection approach for the lithium metal layer.

The sulfonated elastomer-based protective layer appears to be capable of reversibly deforming to a great extent without breakage when the lithium foil decreases in thickness during battery discharge. The two protective layers also prevent the continued reaction between liquid electrolyte and lithium metal at the anode, reducing the problem of continuing loss in lithium and electrolyte. This also enables a significantly more uniform deposition of lithium ions upon returning from the cathode during a battery re-charge step; hence, no lithium dendrite. These were observed by using SEM to examine the surfaces of the electrodes recovered from the battery cells after some numbers of charge-discharge cycles.

Example 11: Sulfonated Elastomer Implemented in the Anode of a Lithium-$LiCoO_2$ Cell (Initially the Cell Anode has an Ultra-Thin Lithium Layer, <1 µm Thick)

The sulfonated elastomer as a lithium-protecting layer was based on the sulfonated polybutadiene (PB) prepared according to a procedure used in Example 7. Tensile testing was also conducted on the sulfonated elastomer films (without the conductive reinforcement material). This series of sulfonated elastomers can be elastically stretched up to approximately 135% (having some lithium salt or conductive reinforcement material dispersed therein) or up to 770% (with no additive).

Figure 4:
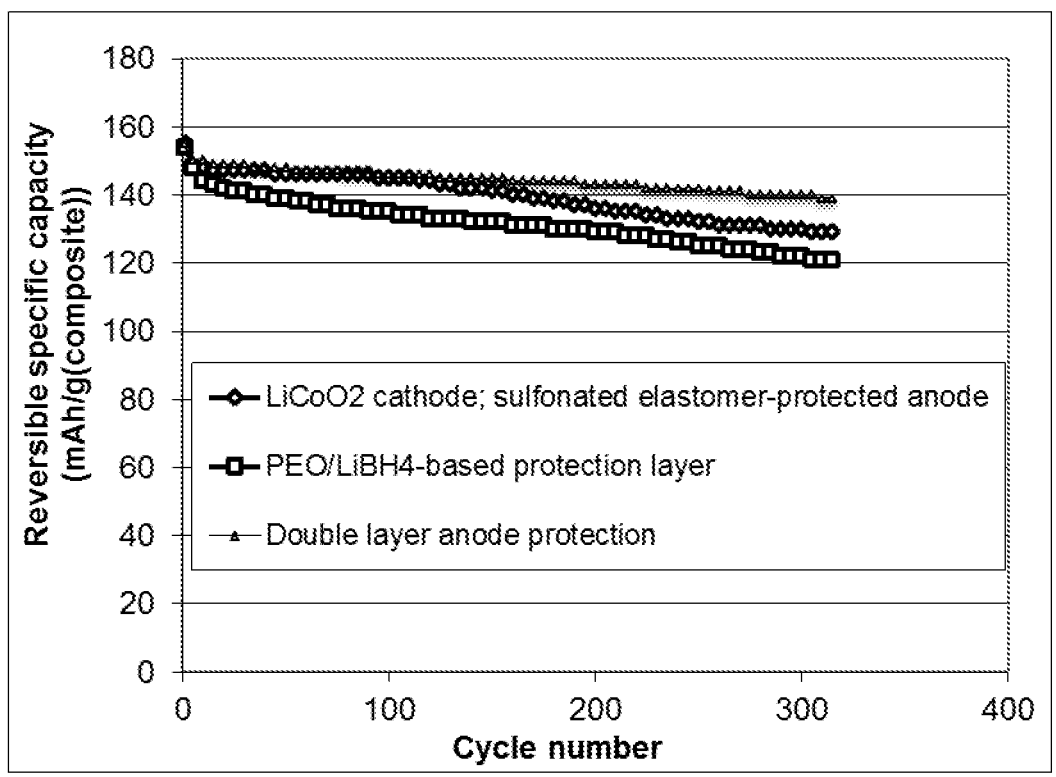
FIG. 4 The specific capacity values of three lithium-$LiCoO_2$ cells (initially the cell being lithium-free) featuring (1) only a sulfonated PB elastomer-based protecting layer at the anode; (2) only a $PEO/LiBH_4$ composite-based protection layer at the anode; and (3) double protection layers for the anode containing a $PEO/LiBH_4$ composite-based $1^{st}$ anode-protecting layer and a sulfonated PB-based $2^{nd}$ anode-protecting layer, respectively.

FIG. 4 shows that the cell having a $PEO/LiBH_4$ composite-based $1^{st}$ anode-protecting layer (prepared in Example 3) and a sulfonated PB-based $2^{nd}$ anode-protecting layer offers the most stable cycling behavior. The sulfonated elastomer also acts to isolate the electrolyte from the lithium coating yet still allowing for easy diffusion of lithium ions.

Example 12: Li Metal Cells Containing Transition Metal Fluoride Nanoparticle-Based Cathode and a Sulfonated Elastomer-Based Anode-Protecting Layer This sulfonated elastomer layer was based on sulfonated styrene-butadiene-styrene triblock copolymer (SBS). Tensile testing was conducted on some cut pieces of these layers. This series of cross-linked polymers can be elastically stretched up to approximately 820% (without any additive). The addition of additives results in an elasticity of approximately 5% (e.g. with 20% carbon black) to 160% (e.g. with 5% graphene sheets, as a conductive additive).

Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 µm. Each type of these metal fluoride particles, along with graphene sheets (as a conductive additive), was then added into an NMP and PVDF binder suspension to form a multiple-component slurry. The slurry was then slurry-coated on Al foil to form cathode layers.

Figure 5:
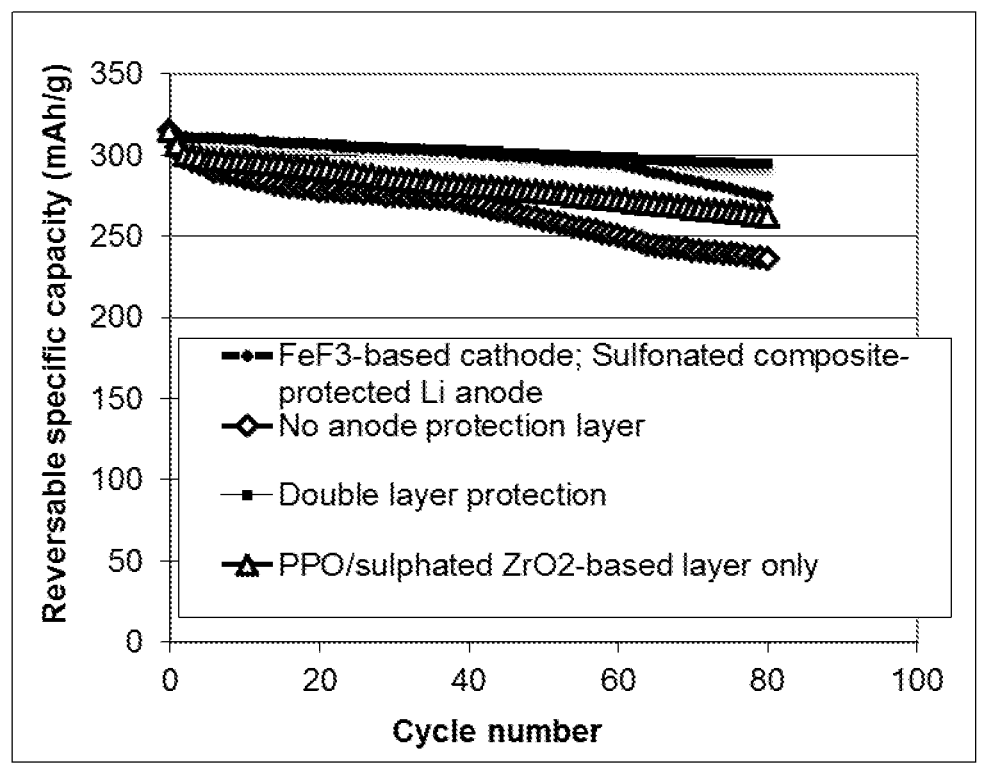
FIG. 5 the discharge capacity curves of four coin cells having the same cathode active material ($FeF_3$), but the $1^{st}$ cell having both a $PPO/sulfated-ZrO_2$-based $1^{st}$ anode-protecting layer and a sulfonated elastomer-based $2^{nd}$ anode-protecting layer, the $2^{nd}$ cell having an elastomer-based protecting layer only, the $3^{rd}$ cell having an ion-conducting $PPO/sulfated-ZrO_2$-based anode-protecting layer only, and the $4^{th}$ cell having no protective layer.

Shown in FIG. 5 are the discharge capacity curves of four coin cells having the same cathode active material ($FeF_3$), but the $1^{st}$ cell having both a $PPO/sulfated-ZrO_2$-based $1^{st}$ anode-protecting layer and a sulfonated elastomer-based $2^{nd}$ anode-protecting layer, the $2^{nd}$ cell having an elastomer-based protecting layer only, the $3^{rd}$ cell having a $PPO/sulfated-ZrO_2$-based anode-protecting layer only, and the $4^{th}$ cell having no protective layer. These results have clearly demonstrated that the double layer protection strategy provides the best protection against capacity decay of a lithium metal battery.

The elastomer layer appears to be capable of reversibly deforming without breakage when the anode layer expands and shrinks during charge and discharge. The elastomer layer and the lithium ion-conducting $PPO/sulfated-ZrO_2$-based layer also prevent continued reaction between the liquid electrolyte and the lithium metal. No dendrite-like features were found with the anode being protected by a sulfonated elastomer composite. This was confirmed by using SEM to examine the surfaces of the electrodes recovered from the battery cells after some numbers of charge-discharge cycles.

Example 13: Li-Organic Cell Containing a Naphthalocyanine/Reduced Graphene Oxide (FePc/RGO) Particulate Cathode and a Protected Li Foil Anode Particles of combined FePc/graphene sheets were obtained by ball-milling a mixture of FePc and RGO in a milling chamber for 30 minutes. The resulting FePc/RGO mixture particles were potato-like in shape. Two lithium cells were prepared, each containing a Li foil anode, a porous separator, and a cathode layer of FePc/RGO particles; one cell containing two anode-protecting layers and the other no protecting layer.

Figure 6:
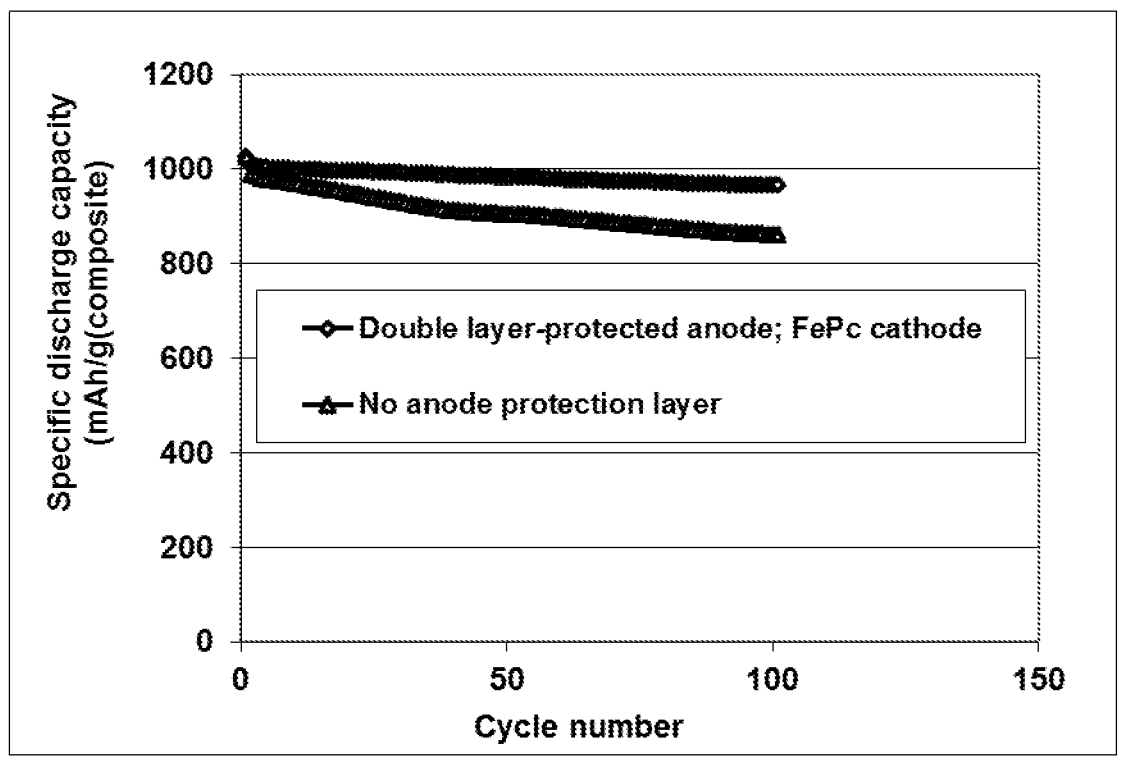
FIG. 6 Specific capacities of two lithium-FePc (organic) cells, each having Li foil as an anode active material and FePc/RGO mixture particles as the cathode active material (one cell containing double layer-protected anode and the other no anode protection layer).

The cycling behaviors of these 2 lithium cells are shown in FIG. 6, which indicates that the lithium-organic cell having a sulfonated elastomer-based $2^{nd}$ protection layer and a $1^{st}$ protecting layer containing a lithium ion-conducting polymer prepared in Example 2 exhibits a significantly more stable cycling response. These protective layers reduce or eliminate the undesirable reactions between the lithium metal and the electrolyte, yet the elastomer layer itself remains in ionic contact with the protected lithium metal and is permeable to lithium ions. This approach has significantly increased the cycle life of all lithium-organic batteries.

Example 14: Effect of Lithium Ion-Conducting Additive in a Sulfonated Elastomer Composite A wide variety of lithium ion-conducting additives were added to several different polymer matrix materials to prepare anode protection layers. The lithium ion conductivity vales of a group of sulfonated elastomer matrix composite materials are summarized in Table 1 below. We have discovered that these composite materials are suitable anode-protecting layer materials provided that their lithium ion conductivity at room temperature is no less than $10^{-6}$ S/cm. With these materials, lithium ions appear to be capable of readily diffusing through the protective layer having a thickness no greater than 1 μm. For thicker polymer films (e.g. 10 μm), a lithium ion conductivity at room temperature of these sulfonated elastomer composites no less than $10^{-4}$ S/cm would be required.

TABLE 1

Lithium ion conductivity of various sulfonated elastomer composite compositions as a lithium metal-protecting layer.

| Sample No. | Lithium-conducting additive | % sulfonated elastomer (1-2 μm thick) | Li-ion conductivity (S/cm) |
|---|---|---|---|
| E-1p | $Li_2CO_3$ + $(CH_2OCO_2Li)_2$ | 70-99% | $1.3 \times 10^{-4}$ to $3.3 \times 10^{-3}$ S/cm |
| B1p | LiF + LiOH + $Li_2C_2O_4$ | 60-90% | $4.2 \times 10^{-5}$ to $2.6 \times 10^{-3}$ S/cm |
| B2p | LiF + HCOLi | 80-99% | $1.2 \times 10^{-4}$ to $1.4 \times 10^{-3}$ S/cm |
| B3p | LiOH | 70-99% | $8.5 \times 10^{-4}$ to $1.1 \times 10^{-2}$ S/cm |
| B4p | $Li_2CO_3$ | 70-99% | $4.3 \times 10^{-3}$ to $9.5 \times 10^{-3}$ S/cm |
| B5p | $Li_2C_2O_4$ | 70-99% | $8.2 \times 10^{-4}$ to $1.3 \times 10^{-2}$ S/cm |
| B6p | $Li_2CO_3$ + LiOH | 70-99% | $1.5 \times 10^{-3}$ to $1.7 \times 10^{-2}$ S/cm |
| C1p | $LiClO_4$ | 70-99% | $4.0 \times 10^{-4}$ to $2.2 \times 10^{-3}$ S/cm |
| C2p | $LiPF_6$ | 70-99% | $2.1 \times 10^{-4}$ to $6.2 \times 10^{-3}$ S/cm |
| C3p | $LiBF_4$ | 70-99% | $1.2 \times 10^{-4}$ to $1.7 \times 10^{-3}$ S/cm |
| C4p | LiBOB + $LiNO_3$ | 70-99% | $1.4 \times 10^{-4}$ to $3.2 \times 10^{-3}$ S/cm |
| S1p | Sulfonated polyaniline | 85-99% | $3.2 \times 10^{-5}$ to $9.5 \times 10^{-4}$ S/cm |
| S2p | Sulfonated PEEK | 85-99% | $1.4 \times 10^{-4}$ to $1.3 \times 10^{-3}$ S/cm |
| S3p | Sulfonated PVDF | 80-99% | $1.7 \times 10^{-4}$ to $1.5 \times 10^{-4}$ S/cm |
| S4p | Polyethylene oxide | 80-99% | $4.2 \times 10^{-4}$ to $3.4 \times 10^{34}$ S/cm |

Example 15: Cycle Stability of Various Rechargeable Lithium Battery Cells

In lithium-ion battery industry, it is a common practice to define the cycle life of a battery as the number of charge-discharge cycles that the battery suffers a 20% decay in capacity based on the initial capacity measured after the required electrochemical formation. Summarized in Table 2 below are the cycle life data of a broad array of batteries featuring an anode with or without an anode-protecting polymer layer.

TABLE 2

Cycle life data of various lithium secondary (rechargeable) batteries.

| Sample ID | Elastomer layer + $Li_{1.4}Al_{0.4}Ti_{1.6}(PO_4)_3$ layer | Type & % of cathode active material | Initial capacity (mAh/g) | Cycle life (No. of cycles) |
|---|---|---|---|---|
| $CuCl_2$-1e | sulfonated elastomer composite | 85% by wt. $CuCl_2$ particles (80 nm) + 7% graphite + 8% binder | 533 | 1,544 |
| $CuCl_2$-2e | none | 85% by wt. $CuCl_2$ particles (80 nm) + 7% graphite + 8% binder | 533 | 115 |
| $BiF_3$-1e | none | 85% by wt. $BiFe_3$ particles + 7% graphene + 8% binder | 275 | 115 |

TABLE 2-continued

Cycle life data of various lithium secondary (rechargeable) batteries.

| Sample ID | Elastomer layer + $Li_{1.4}Al_{0.4}Ti_{1.6}(PO_4)_3$ layer | Type & % of cathode active material | Initial capacity (mAh/g) | Cycle life (No. of cycles) |
|---|---|---|---|---|
| $BiF_3$-2e | Sulfonated elastomer composite + 50% ethylene oxide | 85% by wt. $BiF_3$ particles + 7% graphene + 8% binder | 272 | 1,631 |
| $Li_2MnSiO_4$-1e | sulfonated elastomer composite | 85% C-coated $Li_2MnSiO_4$ + 7% CNT + 8% binder | 250 | 2,525 |
| $Li_2MnSiO_4$-2e | none | 85% C-coated $Li_2MnSiO_4$ + 7% CNT + 8% binder | 252 | 543 |
| $Li_6C_6O_6$-1e | sulfonated elastomer composite + 20% polyanniline | $Li_6C_6O_6$-graphene ball-milled | 439 | 1,620 |
| $Li_6C_6O_6$-2e | none | $Li_6C_6O_6$-graphene ball-milled | 438 | 116 |
| $MoS_2$-1e | sulfonated elastomer composite | 85% $MoS_2$ + 8% graphite + binder | 222 | 1,755 |
| $MoS_2$-2e | none | 85% $MoS_2$ + 8% graphite + binder | 225 | 156 |

In conclusion, the two anode protecting layers are surprisingly effective in alleviating the problems of lithium metal dendrite formation and lithium metal-electrolyte reactions that otherwise lead to rapid capacity decay and potentially internal shorting and explosion of the lithium secondary batteries. The elastomer layer is capable of expanding or shrinking congruently or conformably with the anode active material layer. This capability helps to maintain a good contact between the current collector (or the lithium film itself) and the protective layer(s), enabling uniform re-deposition of lithium ions without interruption.

The anode-protecting layers appear to be capable of performing at least the following three functions:

1) Being highly elastic, the elastomer layer helps to maintain a good contact between a Li metal layer (e.g. lithium metal foil, as the anode active material, protected by a layer of graphene paper) and an electrolyte phase (e.g. an electrolyte/separator assembly or an electrolyte phase) when the Li metal layer decreases in thickness (e.g. due to dissolution of Li in the electrolyte when the battery is discharged) or increases in thickness (e.g. due to re-deposition of lithium metal back to the Cu foil or the lithium metal layer when the battery is recharged). The elastomer can expand and shrink responsive to the shrinkage and expansion of the anode active material layer. Such a conformal or congruent expansion/shrinkage of the elastomer layer helps to eliminate the potential gap between the anode active material layer and the electrolyte, thereby maintaining the lithium ion migration paths required of an operational Li metal battery.

2) The elastomer, infiltrated with a liquid electrolyte (before, during, or after the cell is fabricated) and coupled with its high-elasticity nature (good electrode-electrolyte contact), enables the returning $Li^+$ ions to uniformly and successfully deposit back to the Li metal surface or current collector surface, reducing the formation of dead lithium particles, which otherwise become inactive. The uniform deposition of Li metal also reduces the tendency to form dangerous Li dendrites.

3) Presumably, the 1$^{st}$ anode-protecting layer (covering the lithium metal), having a lithium ion-conducting material serving essentially as an artificial solid-electrolyte interface (SEI) layer, helps to maintain the interfacial stability and reduce or eliminate continued breakage and reformation of the SEI layer (which otherwise would continue to consume lithium ions and the electrolyte).

We claim:

1. A lithium metal secondary battery comprising a cathode, an anode, and an electrolyte or an electrolyte/porous separator assembly disposed between said cathode and said anode, wherein said anode comprises:
   a) an anode active material layer comprising a layer of lithium or lithium alloy, in a form of a foil, coating, or multiple particles aggregated together, as an anode active material;
   b) a first anode-protecting layer having a thickness from 1 nm to 100 μm and comprising a lithium ion-conducting material having a lithium ion conductivity from $10^{-8}$ S/cm to $5 \times 10^{-2}$ S/cm and being in physical contact with the anode active material layer; and
   c) a second anode-protecting layer in physical contact with said first anode-protecting layer, having a thickness from 1 nm to 100 μm and comprising an elastomer having a fully recoverable tensile elastic strain from 2% to 1,000% and a lithium ion conductivity from $10^{-8}$ S/cm to $5 \times 10^{-2}$ S/cm when measure at room temperature;
   wherein said lithium metal secondary battery does not include a lithium-sulfur battery or lithium-selenium battery.

2. The lithium metal secondary battery of claim 1, wherein said elastomer contains a material selected from the group consisting of non-sulfonated versions or sulfonated versions of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, and combinations thereof.

3. The lithium metal secondary battery of claim 1, wherein said lithium ion-conducting material in the first anode-protecting layer is selected from the group consisting of $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, and combinations thereof, wherein X=F, Cl, I, or Br, R=a hydrocarbon group, $0<x\leq1$ and $1\leq y\leq4$.

4. The lithium metal secondary battery of claim 1, wherein said lithium ion-conducting material in the first anode-protecting layer comprises a lithium salt selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

5. The lithium metal secondary battery of claim 1, wherein said lithium ion-conducting material in the first anode-protecting layer comprises a lithium ion-conducting polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethyl siloxane, poly(vinylidene fluoride)-hexafluoropropylene (PVDF-HFP), a co-polymer thereof, sulfonated derivatives thereof, and combinations thereof.

6. The lithium metal secondary battery of claim 1, wherein said lithium ion-conducting material comprises an inorganic solid-state electrolyte material having a lithium ion conductivity greater than $10^{-6}$ S/cm and containing a material selected from NASICON-type, garnet-type, LISICON-type, perovskite-type, sulfide-type, $Li_3N$-type, Argyrodite-type, or a thin-film solid state electrolyte.

7. The lithium metal secondary battery of claim 1, wherein said lithium ion-conducting material comprises an inorganic solid-state electrolyte material selected from a ceramic electrolyte, glass electrolyte, glass-ceramic electrolyte, sulfide electrolyte, or a combination thereof.

8. The lithium metal secondary battery of claim 7, wherein said solid-state electrolyte material comprises particles of a ceramic electrolyte, glass electrolyte, glass-ceramic-type, $Li_3N$-type, argyrodite-type, or sulfide-type electrolyte that are bonded together by a resin binder to form said first anode-protecting layer.

9. The lithium metal secondary battery of claim 1, wherein said elastomer further comprises from 0.1% to 40% by weight of a lithium ion-conducting additive dispersed therein.

10. The lithium metal secondary battery of claim 9, wherein said lithium ion-conducting additive is selected from the group consisting of $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, and combinations thereof, wherein X=F, Cl, I, or Br, R=a hydrocarbon group, $0<x\leq1$ and $1\leq y\leq4$.

11. The lithium metal secondary battery of claim 9, wherein said lithium ion-conducting additive contains a lithium salt selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

12. The lithium metal secondary battery of claim 9, wherein said lithium ion-conducting additive comprises a lithium ion-conducting polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), sulfonated derivatives thereof, and combinations thereof.

13. The lithium metal secondary battery of claim 1, wherein said elastomer further contains a conductive reinforcement material dispersed therein and said conductive reinforcement material is selected from an electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, or a combination thereof.

14. The lithium metal secondary battery of claim 13, wherein said electron-conducting polymer is selected from the group consisting of polyaniline, polypyrrole, polythiophene, polyfuran, a bi-cyclic polymer, sulfonated derivatives thereof, and combinations thereof.

15. The lithium metal secondary battery of claim 1, wherein said first or second anode-protecting layer has a thickness from 10 nm to 10 μm.

16. The lithium metal secondary battery of claim 1, wherein said cathode active material is selected from an inorganic material, an organic material, a polymeric material, or a combination thereof, and said inorganic material does not include sulfur or alkali metal polysulfide.

17. The lithium metal secondary battery of claim 16, wherein said inorganic material is selected from a metal oxide, metal phosphate, metal silicide, metal selenide, transition metal sulfide, or a combination thereof.

18. The lithium metal secondary battery of claim 16, wherein said inorganic material is selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, and combinations thereof.

19. The lithium metal secondary battery of claim 16, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, CuF, $SnF_2$, AgF, $CuCl_2$, $FeCl_3$, $MnCl_2$, and combinations thereof.

20. The lithium metal secondary battery of claim 16, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq1$.

21. The lithium metal secondary battery of claim 16, wherein said inorganic material is selected from a transition metal dichalcogenide, a transition metal trichalcogenide, or a combination thereof.

22. The lithium metal secondary battery of claim 16, wherein said inorganic material is selected from the group consisting of $TiS_2$, $TaS_2$, $MoS_2$, $NbSe_3$, $MnO_2$, $CoO_2$, iron oxide, vanadium oxide, and combinations thereof.

23. The lithium metal secondary battery of claim 17, wherein said metal oxide comprises a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x \le 5$.

24. The lithium metal secondary battery of claim 17, wherein said metal oxide or metal phosphate is selected from a layered compound $LiMO_2$, spinel compound $LiM_2O_4$, olivine compound $LiMPO_4$, silicate compound $Li_2MSiO_4$, tavorite compound $LiMPO_4F$, borate compound $LiMBO_3$, or a combination thereof, wherein M is a transition metal or a mixture of multiple transition metals.

25. The lithium metal secondary battery of claim 16, wherein said inorganic material is selected from the group consisting of (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, and (e) combinations thereof.

26. The lithium metal secondary battery of claim 16, wherein said organic material or polymeric material is selected from the group consisting of poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, hexaazatrinaphtylene (HATN), hexaazatriphenylene hexacarbonitrile ($HAT(CN)_6$), 5-benzylidene hydantoin, isatine lithium salt, pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, and combinations thereof.

27. The lithium metal secondary battery of claim 26, wherein said thioether polymer is selected from the group consisting of poly[methanetetryl-tetra(thiomethylene)] (PMTTM), poly(2,4-dithiopentanylene) (PDTP), polymer containing poly(ethene-1,1,2,2-tetrathiol) (PETT) as a main-chain thioether polymers, side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene](PTKPTB, and poly[3,4(ethylenedithio)thiophene] (PEDTT).

28. The lithium metal secondary battery of claim 16, wherein said organic material comprises a phthalocyanine compound selected from the group consisting of copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, chemical derivatives thereof, and combinations thereof.

29. The lithium metal secondary battery of claim 1, wherein said cathode comprises a cathode active material in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

30. The lithium metal secondary battery of claim 1, wherein said battery does not contain a porous separator and the second anode-protecting layer acts as a separator that electronically separates the anode active material layer from the cathode.

* * * * *